US012795013B2

(12) United States Patent
Kumar Agrawal et al.

(10) Patent No.: US 12,795,013 B2
(45) Date of Patent: Nov. 10, 2026

(54) ELECTRONIC DEVICES WITH ILLUMINATIVE FABRIC DISPLAYS AND CORRESPONDING METHODS

(71) Applicant: Motorola Mobility LLC, Chicago, IL (US)

(72) Inventors: Amit Kumar Agrawal, Bangalore (IN); Mark D Finney, Chicago, IL (US); Eunji Kim, Chiacgo, IL (US); Mayank Gupta, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 398 days.

(21) Appl. No.: 18/410,824

(22) Filed: Jan. 11, 2024

(65) Prior Publication Data

US 2025/0233937 A1 Jul. 17, 2025

(51) Int. Cl.

*H04M 1/72409* (2021.01)
*H04M 1/02* (2006.01)
*H04M 1/72442* (2021.01)
*H04M 1/72466* (2021.01)

(52) U.S. Cl.

CPC ... *H04M 1/724092* (2022.02); *H04M 1/0283* (2013.01); *H04M 1/724095* (2022.02); *H04M 1/72442* (2021.01); *H04M 1/72466* (2021.01)

(58) Field of Classification Search

CPC ......... H04M 1/724092; H04M 1/0283; H04M 1/724095; H04M 1/72442; H04M 1/72466

See application file for complete search history.

(56) References Cited

U.S. PATENT DOCUMENTS

| | | | | |
|---|---|---|---|---|
| 5,906,004 | A | 5/1999 | Lebby et al. | |
| 6,381,482 | B1 | 4/2002 | Jayaraman et al. | |
| 9,839,123 | B2 | 12/2017 | Keymeulen | |
| 11,176,862 | B2 | 11/2021 | Agrawal et al. | |
| 2008/0182475 | A1 | 7/2008 | Gnade | |
| 2013/0191741 | A1 | 7/2013 | Dickinson | |
| 2019/0369936 | A1 * | 12/2019 | Wang | G06F 1/1613 |

FOREIGN PATENT DOCUMENTS

| | | |
|---|---|---|
| CN | 202805923 | 3/2013 |
| CN | 106811900 | 5/2019 |

OTHER PUBLICATIONS

"BMW is Bringing Forth Its New Design Language", Published Jan. 30, 2019 online at https://frameweb.com/article/bmw-is-bringing-forth-its-new-design-language.

"Chinese Scientists Invent a Lit Fabric", Viewed online Nov. 17, 2023 at https://www.brokenhousecompany.it/blog/blog/2021/09/07/chinese-scientists-invent-a-lit-fabric/.

(Continued)

*Primary Examiner* — Ayodeji O Ayotunde

(74) *Attorney, Agent, or Firm* — Philip H. Burrus, IV

(57) ABSTRACT

An electronic device includes a device housing. An illuminative fabric display is coupled to the device housing. One or more processors of the electronic device are configured to cause the illuminative fabric display to present content. The presentation of content can be in response to user input and may occur only when one or more sensors determine that a primary display of the electronic device defines a bottom side of the electronic device in three-dimensional space.

21 Claims, 11 Drawing Sheets

(56) References Cited

OTHER PUBLICATIONS

"Chinese University creates electronic textile with large display", Published Mar. 30, 2021 online at https://www.technicaltextile.net/news/chinese-university-creates-electronic-textile-with-large-display-273197.html.
"Cloth to replace smartphone display is developed", Published online Mar. 16, 2021 at https://gigazine.net/gsc_news/en/20210316-smart-color-changing-textile/.
"Color Changing Film—Prism", Eink; Unknown exact publication date but believe to be prior to filing of present application; Published online at https://www.eink.com/brand?bookmark=Prism.
"Dynamically Adapting Visual Characteristics of an Electronic Device's Exterior Material to Provide Contextual Visual Cues", filed Oct. 24, 2023; U.S. Appl. No. 18/494,530.
"Electroluminescent Unit Image", Unknown Image source or publication date; Believed to be prior to filing of present application.
Shi, et al., "Large-area display textiles integrated with functional systems", Published in Nature on Mar. 10, 2021; Available online at https://pubmed.ncbi.nlm.nih.gov/33692559/.
Slavov, Mariyan , "Poll: Are color-changing phones the next big thing in smartphone design?", Published online Jan. 5, 2022 at https://www.phonearena.com/news/color-changing-phones_id137573.

* cited by examiner

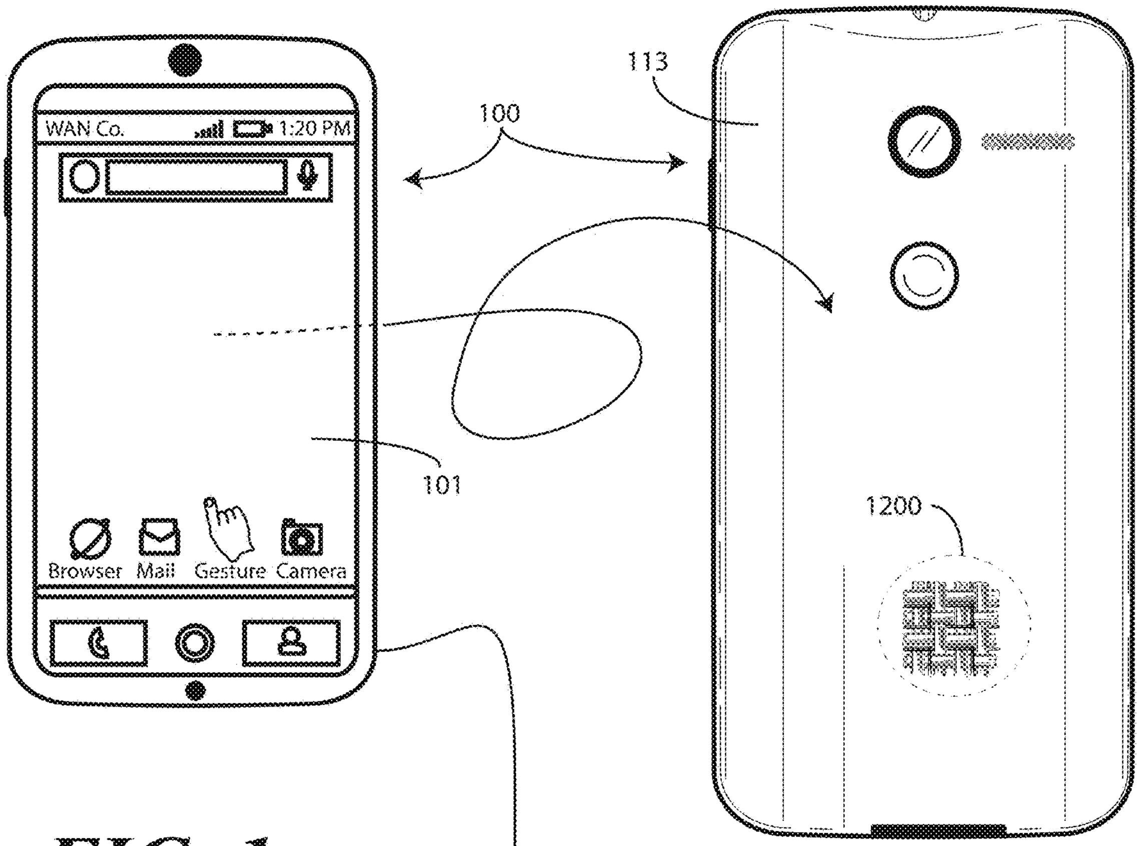
FIG. 1
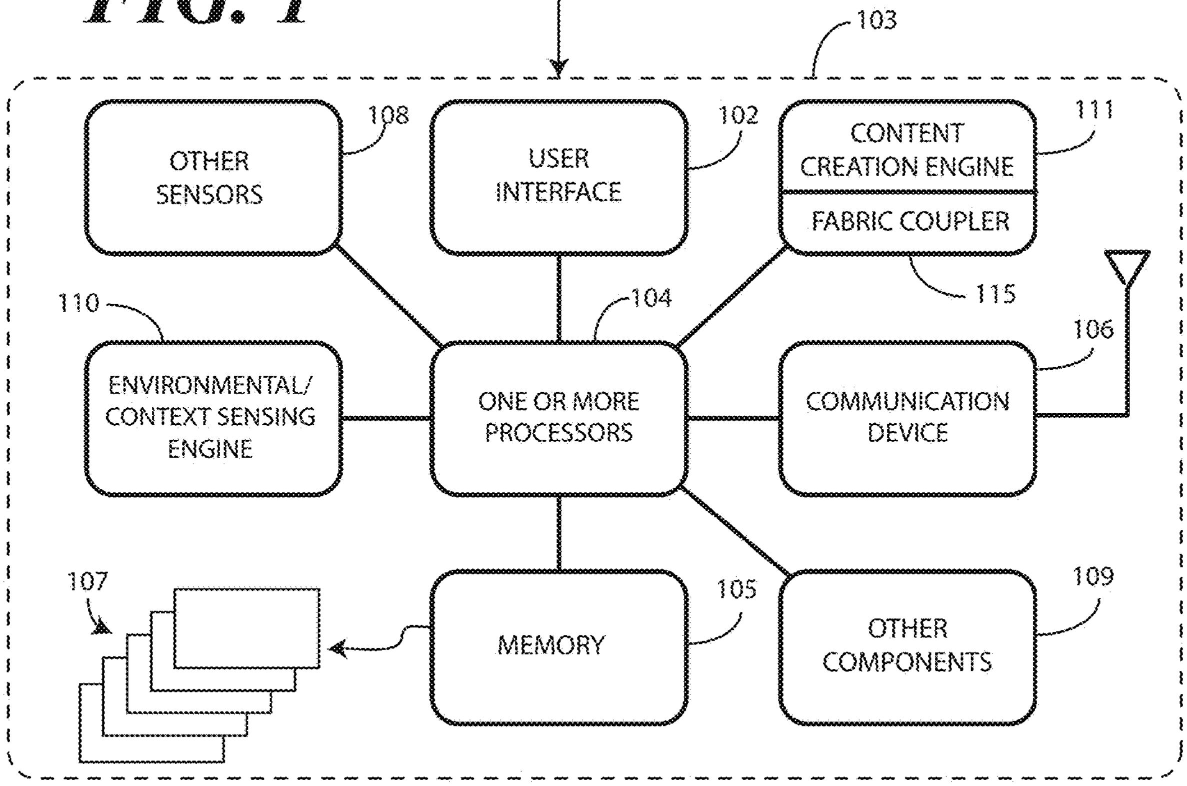

-- PRIOR ART --

ELECTRONIC DEVICES WITH ILLUMINATIVE FABRIC DISPLAYS AND CORRESPONDING METHODS

BACKGROUND

Technical Field

This disclosure relates generally to electronic devices, and more particularly to electronic devices having displays.

Background Art

Portable electronic device usage has become ubiquitous. Vast majorities of the population carry a smartphone, tablet computer, or laptop computer daily to communicate with others, stay informed, to consume entertainment, and to manage their lives.

As the technology incorporated into these portable electronic devices has become more advanced, so too has their feature set. A modern smartphone includes more computing power than a desktop computer of only a few years ago. Additionally, while early generation portable electronic devices included physical keypads, most modern portable electronic devices include touch-sensitive displays. It would be advantageous to have an improved electronic device with improved display capabilities to improve the user experience.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 1 illustrates one explanatory electronic device in accordance with one or more embodiments of the disclosure.

Figure 2:
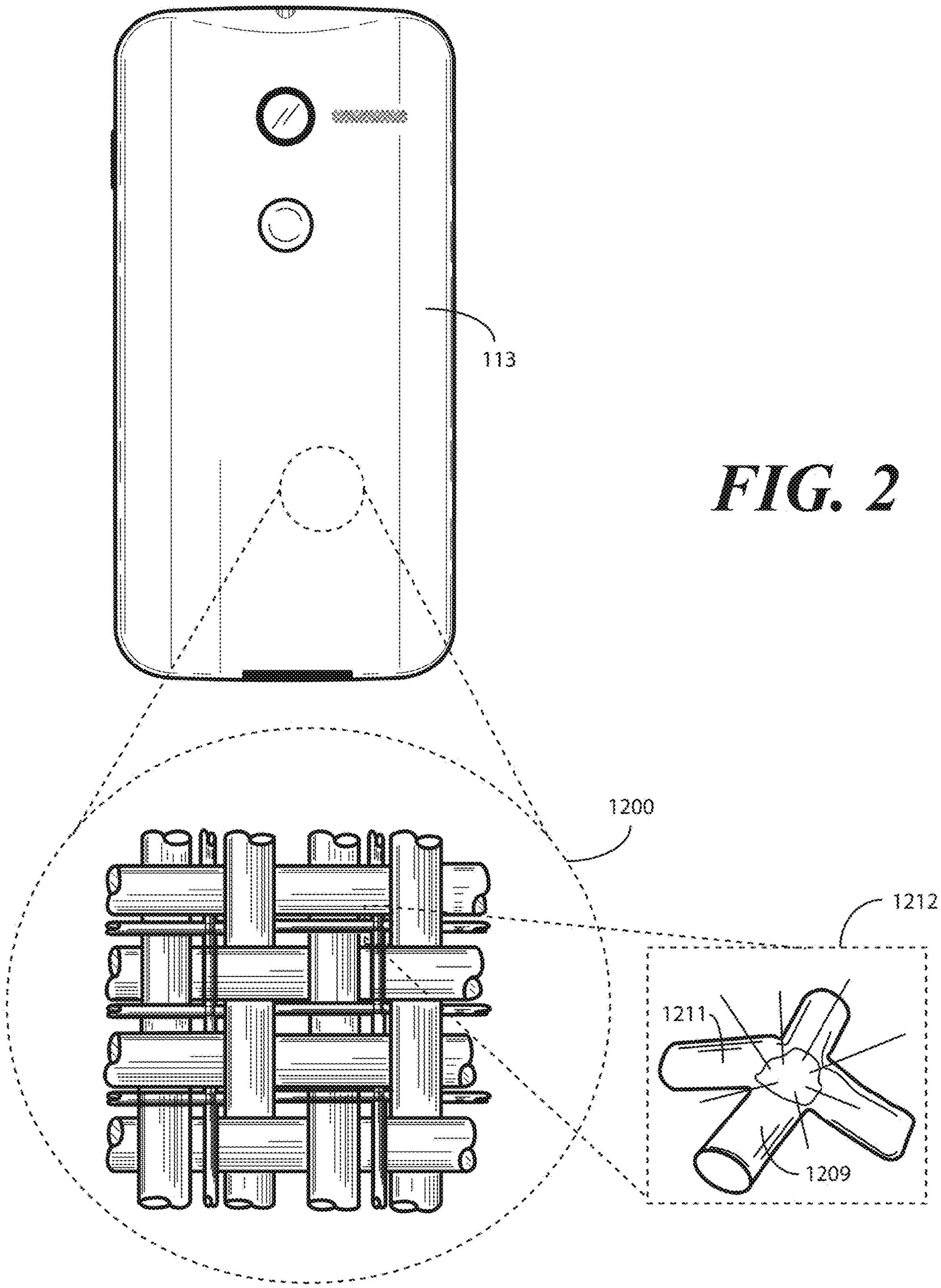
FIG. 2 illustrates another explanatory electronic device configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to control of electronic devices having device housings with illuminative fabric display coupled to the device housing. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of presenting, by one or more processors of an electronic device, content on an illuminative fabric display as described herein. The non-processor circuits may include, but are not limited to, a radio receiver, a radio transmitter, signal drivers, clock circuits, power source circuits, and user input devices.

As such, these functions may be interpreted as steps of a method to perform causing the presentation of content along an illuminative fabric display, be it coupled to a device housing of an electronic device, integrated into the device housing of the electronic device, or integrated into a companion device that is separate from the electronic device. Alternatively, some or all functions could be implemented by a state machine that has no stored program instructions, or in one or more application specific integrated circuits (ASICs), in which each function or some combinations of certain of the functions are implemented as custom logic.

Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that many electronic devices look very similar when placed on a surface with their displays oriented toward the surface. Illustrating by example, many smartphones look the same when their displays are placed on a table with their device housings facing upward. Embodiments of the disclosure also contemplate that users sometimes try to "spice up" the device housings of their electronic devices by placing covers atop those device housings. However, such covers not only spoil the beauty of the electronic device itself but also make the device housing not useful for touch sensitivity and other design features.

Embodiments of the disclosure contemplate that users need a balance of feeling connected while still focusing on what matters most at the moment. To be sure, modern mindfulness concepts suggest that by putting a smartphone face down on a table allows users to stay more focused on tasks at hand. However, in doing so the user has no awareness of information that may be presented on the primary display.

What's more, embodiments of the disclosure contemplate that many smartphones and tablet computers have device housings that are often the same color. There is thus an opportunity to provide on-demand, minimal information to a user while allowing the user to stay focused. Such minimal information can provide the joy of not missing out while allowing focus and the ability of a user to stay informed of important notifications.

Indeed, in many instances users place their smartphones or other devices face down so that they will not be disturbed. It is frequently the case that people do not want to be distracted by the myriad of notifications and text messages modern electronic devices receive on a continual basis. However, embodiments of the disclosure contemplate that there are also times where people want to quickly check important information. With traditional electronic devices, doing so is cumbersome because the user must pick up the device, turn it over, interact with the display, and so forth.

Embodiments of the disclosure provide a solution to these issues by providing an electronic device comprising a device housing and an illuminative fabric display coupled to the device housing. In one or more embodiments, the illuminative fabric display allows the user to gain access to the information that they need on from the rear side of the electronic device. Advantageously, embodiments of the disclosure bridge the gap between full information and no information by providing subtle information on demand, or on an as needed basis, using an illuminative fabric display.

In one or more embodiments, an electronic device comprises a device housing and an illuminative fabric display coupled to the device housing. In one or more embodiments, the illuminative fabric display comprises warps and wefts of textile material arranged in a weave with electroluminescent elements interspaced within the warps and wefts of the textile material.

In one or more embodiments, the electroluminescent elements are defined by intersections of luminescent warps and transparent conductive wefts within the weave. In one or more embodiments, the illuminative fabric display is integrated into the device housing. In other embodiments, the illuminative fabric display can be integrated into a case that attaches to the electronic device.

In one or more embodiments, when an electronic device has an integrated illuminative fabric display, the electronic device is able to provide messages and notifications on the rear side of the electronic device using the illuminative fabric display. Illustrating by example, when the electronic device is placed with the primary display facing a support surface, in one or more embodiments a user can tap the illuminative fabric display integrated into the device housing or a case attached to the device housing to check the time, get information about recently received messages, or get information about recently received notifications.

In one or more embodiments, gestures across the illuminative fabric display can be associated with predefined actions within the electronic device. Simple gestures, for example, can be associated with user configurable actions. In one or more embodiments, a user is provided a choice to associate a device action based upon a favorite application or favorite application actions or features.

Embodiments of the disclosure contemplate certain actions in the electronic device need the user to unlock the device and thereafter actively interact with the electronic device for a particular action to be performed or setting to take effect. Advantageously, using embodiments of the disclosure, such actions or settings can be assigned to the illuminative fabric display.

Additionally, in one or more embodiments the illuminative fabric display can be sued to alert the user to device behavior in situations where accessing hard keys or user actuation targets is inconvenient. For example, when using ear buds a user may assign user actuation targets to the illuminative fabric display that allow the volume of the earbuds to be increased or decreased. Advantageously, embodiments of the disclosure allow the user to deliver gestures to the illuminative fabric display to adjust volume rather than having to physically access manual controls or user actuation targets presented on the primary display.

In one or more embodiments, a method for an electronic device comprises presenting, by one or more processors of the electronic device, content on an illuminative fabric display coupled to a device housing of the electronic device. In one or more embodiments, the content is presented in response to user input received by the illuminative fabric display. Accordingly, a tap on the device housing of the electronic device may cause the time and minimal command line interface experiences to appear such as music player application song changes, notifications of messages, or caller line identification.

While integrating an illuminative fabric display into a device housing of an electronic device works well for most applications, embodiments of the disclosure are not so limited. In other embodiments, the illuminative fabric display can be integrated int a companion device, one example of which is a case.

Thus, in one or more embodiments a system comprises an electronic device and a companion device, which is separate from the electronic device. In one or more embodiments, the electronic device comprises a device housing, a communication device situated within the device housing, and one or more processors situated within the device housing that are operable with the communication device. In one or more embodiments, the communication device comprises an illuminative fabric display coupled to another communication device electronically in communication with the communication device of the electronic device. In one or more embodiments, the one or more processors are operable to cause the companion device to present content along the illuminative fabric display by causing the communication device to transmit electronic signals to the other communication device.

While the communication device can be configured as a case that couples to the electronic device, in other embodiments the companion device is configured as a wrist-wearable strap. In one or more embodiments, the one or more processors are configured to cause the illuminative fabric display of the companion device to present content when a primary display of the electronic device is inaccessible to a user of the electronic device, such as when the electronic device has been placed on a surface with the primary display facing downward. Thus, in one or more embodiments the one or more processors are configured to cause the companion device to present the content along the illuminative fabric display by causing the communication device to transmit the electronic signals to the other communication device only when the primary display of the electronic device defines a bottom surface of the device housing in three-dimensional space.

Advantageously, embodiments of the disclosure surface "on demand" information on an illuminative fabric display. Embodiments of the disclosure can also provide a user the ability to interact with the illuminative fabric display to actuate an action on the rear surface of the electronic device as well. Other advantages will be described below. Still others will be obvious to those of ordinary skill in the art having the benefit of this disclosure.

Figure 12:
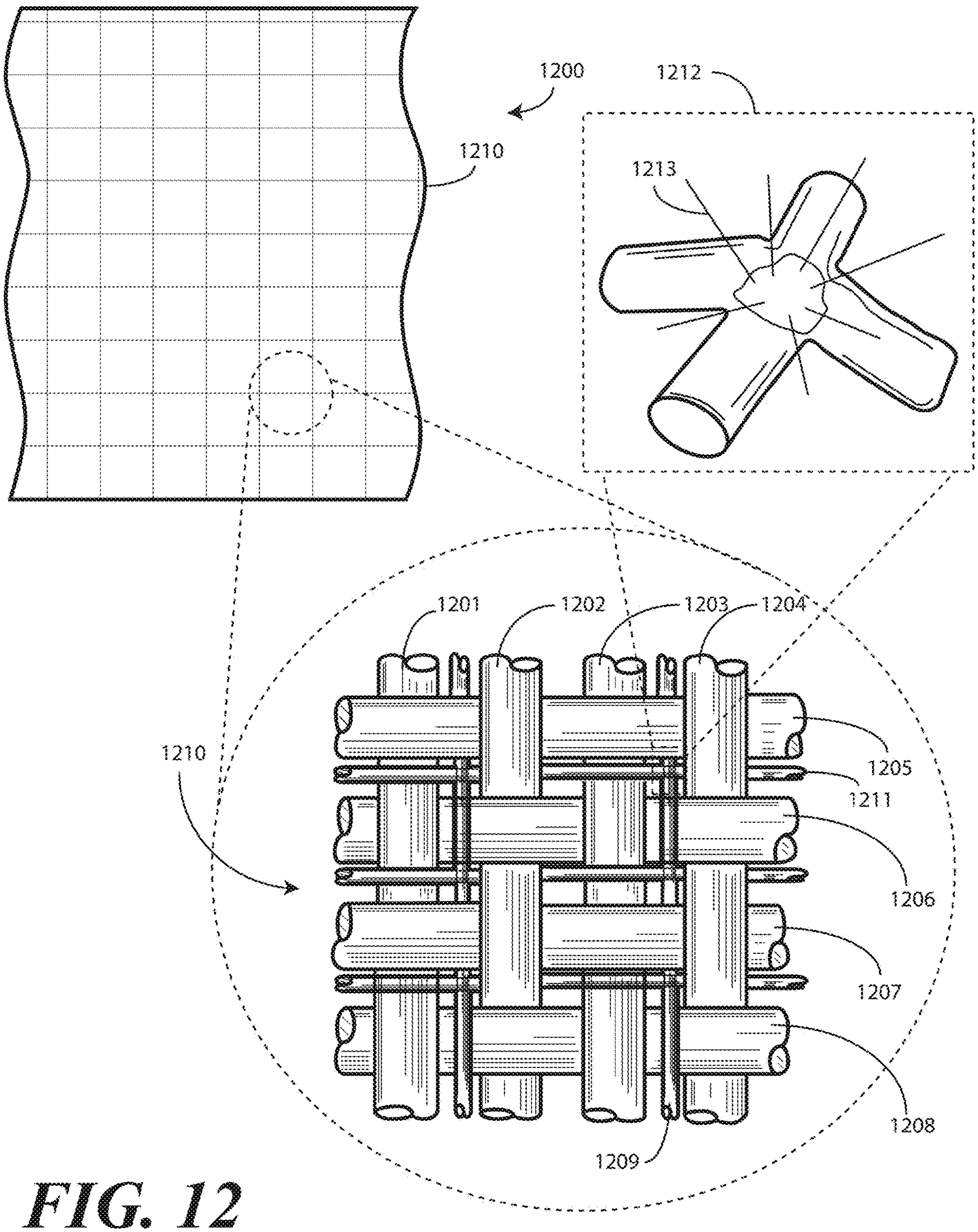
FIG. 12 illustrates a prior art device.

Turning now to FIG. 12, illustrated therein is a prior art illuminative fabric display 1200. Such illuminative fabric displays 1200 have been recently developed by research teams and Fudan University in China, as well as by others. BMW™ has recently developed a handwove Jacquard cloth that "comes to life at the touch of a finger," and which utilizes light emitting diodes that light up beneath the cloth.

Similarly, U.S. Pat. No. 9,839,123 to Keymeulen, which is incorporated herein by reference for all purposes, describes a smart textile product comprising electrically conductive threads and optoelectronic components allowing the smart textile product to be used as a display. US Published Patent Application No. 2008/0182475, to Gnade, which is also incorporated herein by reference for all purposes, describes a textile having ribbons containing inorganic NMOS devices in contact with ribbons containing PMOS deices to enable flexible textile displays as well.

The illustrative illuminative fabric display 1200 is shown as a sheet 1210 of textile material. The sheet 1210 of textile material is breathable and durable and is constructed by weaving conductive fibers 1211 and luminescent fibers 1209 into a weave of textile materials. Where the conductive fibers 1211 and luminescent fibers 1209 intersect, selectively controllable electroluminescent elements 1212 capable of emitting light 1213 are defined.

In one or more embodiments, conductive fibers 1211 and luminescent fibers 1209 are woven into a woven textile material. In one or more embodiments, the woven textile material comprises a one-ply weave. In other embodiments, the woven textile material comprises a two-ply weave. An expanded view of a section of the sheet 1210 is also shown to highlight the woven nature of the illuminative fabric display 1200, as well as the conductive fibers 1211 and luminescent fibers 1209.

In one embodiment, the illuminative fabric display 1200 includes warps 1201,1202,1203,1204 and wefts 1205,1206,1207,1208. The warps 1201,1202,1203,1204 are elements of the illuminative fabric display 1200 that run vertically in the view of FIG. 12, while the wefts 1205,1206,1207,1208 run horizontally. Note that while the terms "warps" and "wefts" are used illustratively to describe the weave, those of ordinary skill in the art having the benefit of this disclosure will note that alternate terms, such as "warp threads," or "warp yarns" can be substituted for "warps." Similarly, "weft fill" or "weft threads" can be substituted for "wefts." In one embodiment, an example of which has been constructed by Fudan University, the warps 1201,1201,1203,1204 and wefts 1205,1206,1207,1208 comprise cotton.

In one embodiment, the 1201,1201,1203,1204 and wefts 1205,1206,1207,1208 define a taffeta weave. A "taffeta" weave is a style of weave where the threads forming the wefts 1205,1206,1207,1208 and warps 1201,1202,1203,1204 intertwine alternatively to produce the checkerboard effect shown in FIG. 12. In the illustrative embodiment of FIG. 12, the warps 1201,1202,1203,1204 and wefts 1205,1206,1207,1208 are each substantially parallel to other warps 1201,1202,1203,1204 and wefts 1205,1206,1207,1208, respectively. The warps 1201,1202,1203,1204 of this illustrated embodiment are substantially perpendicular to the wefts 1205,1206,1207,1208.

While cotton is one material that can be used for the warps 1201,1202, 1203, 1204 and wefts 1205,1206,1207,1208, others will be obvious to those of ordinary skill in the art having the benefit of this disclosure. For example, in one embodiment synthetic materials other than cotton may be utilized where the synthetic material is capable of being configured into a taffeta weave.

In one embodiment, the weave also includes, woven with the warps 1201,1202,1203,1204 and wefts 1205,1206,1207,1208, conductive fibers 1211 and luminescent fibers 1209. In the illustrative embodiment of FIG. 1, the conductive fibers 1211 are configured as wefts, while the luminescent fibers 1209 are configured as warps. However, the opposite can be true as well.

In research conducted by Huisheng Peng, a professor in the Department of Macromolecular engineering at Fudan University, which has been published in the journal Nature (2021 March; 591 (7849): 240-245. doi: 10.1038/s41586-021-03295-8. Epub 2021 Mar. 10), the illuminative fabric display can be integrated with a touch-sensitive fabric keyboard and a fabric power supply, which optionally harvests solar energy. Accordingly, when coupled to electronic circuits, the illuminative fabric display 1200 can be used as a display device. In one or more embodiments, the electroluminescent elements 1212 selectively produce light to cause the illuminative fabric display 1200 to present information to the user.

In one or more embodiments, the illuminative fabric display 1200 is woven precisely, with the conductive fibers 1211 and luminescent fibers 1209 having diameters of between 0.2 millimeters and 0.5 millimeter such that the illuminative fabric display 1200 is ultra-fine and ultra-flexible. Accordingly, this allows the illuminative fabric display 1200 to wrap around objects, one example of which is a device housing of an electronic device as described below with reference to FIG. 1.

Turning now to FIG. 1, illustrated therein is one explanatory electronic device 100 configured in accordance with embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, desktop computers, notebook computers, and so forth. Still other types of conferencing system terminal devices can be configured in accordance with one or more embodiments of the disclosure as will be readily appreciated by those of ordinary skill in the art having the benefit of this disclosure.

This illustrative electronic device 100 includes a display 101, which may optionally be touch-sensitive. In one embodiment where the display 101 is touch-sensitive, the display 101 can serve as a primary user interface 102 of the electronic device 100. Users can deliver user input to the display 101 of such an embodiment by delivering touch input from a finger, stylus, or other objects disposed proximately with the display 101.

In one embodiment, the display 101 is configured as an active-matrix organic light emitting diode (AMOLED) display. However, it should be noted that other types of displays, including liquid crystal displays, would be obvious to those of ordinary skill in the art having the benefit of this disclosure. Where the electronic device 100 is configured with a keyboard and/or mouse, such as when the electronic device 100 is configured as a computer, the keyboard and/or mouse can serve as the primary user interface 102.

Figure 9:
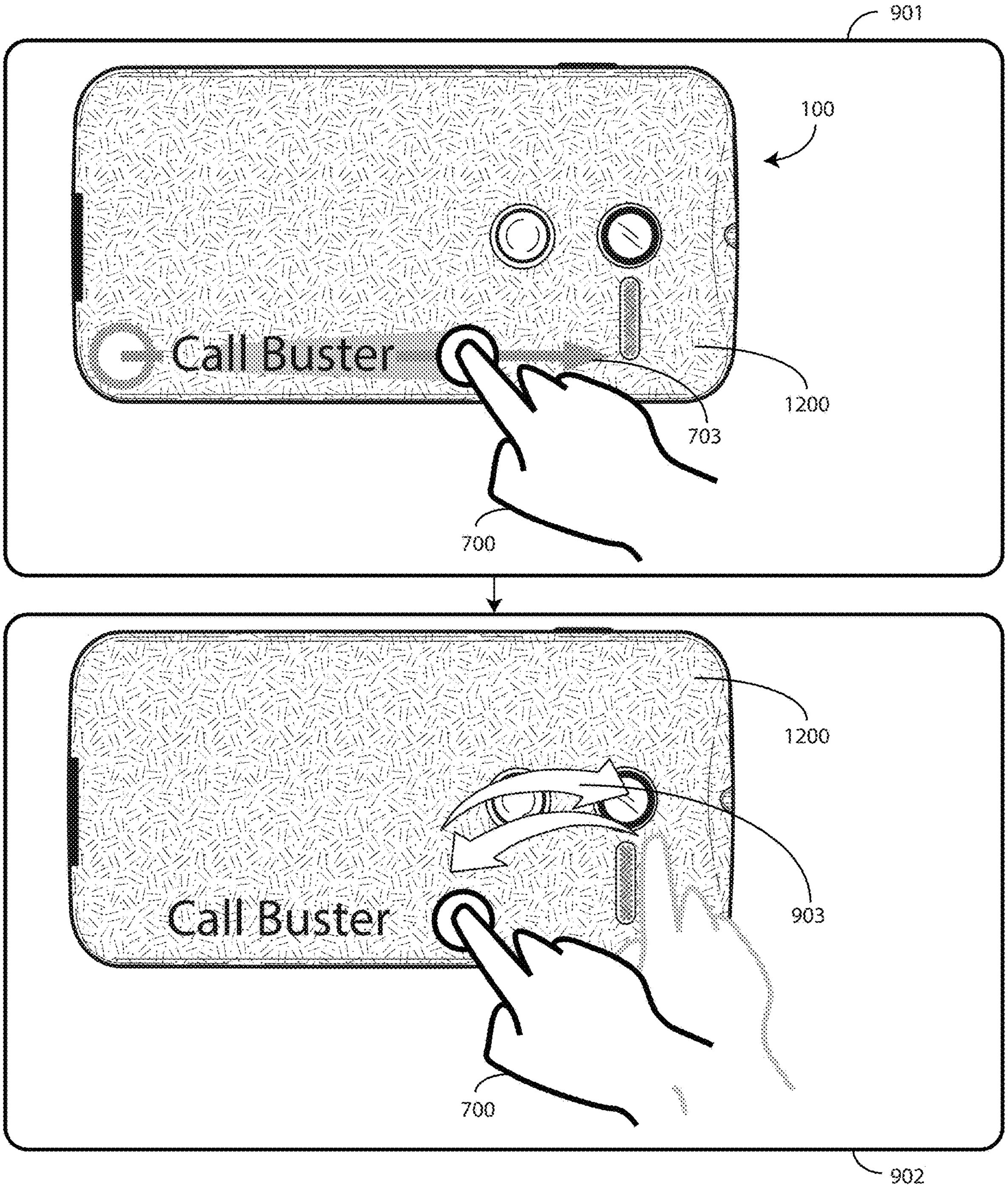
FIG. 9 illustrates one or more method steps in accordance with one or more embodiments of the disclosure.

A block diagram schematic 103 of the electronic device 100 is also shown in FIG. 9. The block diagram schematic 103 can be configured as a printed circuit board assembly disposed within the device housing of the electronic device 100. Various components can be electrically coupled together by conductors, or a bus disposed along one or more printed circuit boards.

In one or more embodiments, the electronic device 100 includes one or more processors 104. In one embodiment, the one or more processors 104 can include an application processor and, optionally, one or more auxiliary processors. One or both of the application processor or the auxiliary processor(s) can include one or more processors. One or both of the application processor or the auxiliary processor (s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 105, can optionally store the executable software code used by the one or more processors 104 during operation as one or more modules 107.

The electronic device 100 also includes a communication device 106 that can be configured for wired or wireless communication with one or more other devices or networks. The networks can include a wide area network, a local area network, and/or personal area network. The communication device 106 may also utilize wireless technology for communication, such as, but are not limited to, peer-to-peer or ad hoc communications such as HomeRF, near-field communications (NFC), Bluetooth and IEEE 802.11, and other forms of wireless communication such as infrared technology. The communication device 106 can include wireless communication circuitry, one of a receiver, a transmitter, or transceiver, and one or more antennas.

In one embodiment, the one or more processors 104 can be responsible for performing the primary functions of the electronic device 100. For example, in one embodiment the one or more processors 104 comprise one or more circuits operable with one or more user interface devices, which can include the display 101, to engage in audio or video conferences by transmitting, receiving, and presenting images, video, or other presentation information. The executable software code used by the one or more processors 104 can be configured as one or more modules that are operable with the one or more processors 104. Such modules can store instructions, control algorithms, logic steps, and so forth.

In one embodiment, the one or more processors 104 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100.

The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 104 may generate commands or execute control operations based upon user input received at the user interface 102. Moreover, the one or more processors 104 may process the received information alone or in combination with other data, such as the information stored in the memory 105.

The electronic device 100 can include one or more sensors 108. The one or more sensors 108 may include a microphone, an earpiece speaker, and/or a second loudspeaker. The one or more other sensors 108 may also include touch actuator selection sensors, proximity sensors, a touch pad sensor, a touch screen sensor, a capacitive touch sensor, and one or more switches. Touch sensors may be used to indicate whether any of the user actuation targets present on the display 101, including the audio difficulties user actuation targets described above, are being actuated. The other sensors 108 can also include audio sensors and video sensors (such as a camera).

The one or more other sensors 108 can optionally include physical sensors configured to sense or determine physical parameters indicative of conditions in an environment about an electronic device 100. Examples include a touch sensor, examples of which include a capacitive touch sensor, an infrared touch sensor, resistive touch sensors, or another touch-sensitive technology, a geo-locator that serves as a location detector, and a near field communication circuit for communication with local area networks to receive information regarding the context of the environment in which an electronic device 100 is located. Other examples of the one or more sensors 108 include a motion detector, examples of which include an accelerometer, gyroscopes, or other devices, a force sensor configured to detect contact with either the display 101 or the housing of an electronic device 100, one or more proximity sensors, a moisture detector configured to detect the amount of moisture on or about the display 101 or the housing of the electronic device 100, an intelligent imager configured to capture an image of an object and determine whether the object matches predetermined criteria, a barometer that senses changes in air pressure due to environmental and/or weather changes, a gaze detector having sensors for detecting the user's gaze point, a light sensor that can detect changes in optical intensity, color, light, or shadow in the environment of an electronic device 100, an audio capture device having one or more microphones to receive acoustic input, a hygrometer used to detect humidity, or other sensors. This list is illustrative only and is not comprehensive. Numerous other sensors could be added. For example, a wind-speed monitor could be included to detect wind. Accordingly, the one or more sensors 108 listed above are illustrative only, as numerous others will be obvious to those of ordinary skill in the art having the benefit of this disclosure.

Other components 109 operable with the one or more processors 104 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

The other components 109 can also include an audio input/processor. The audio input/processor can include hardware, executable code, and speech monitor executable code in one embodiment. The audio input/processor can include, stored in memory 105, basic speech models, trained speech models, or other modules that are used by the audio input/processor to receive and identify voice commands that are received with audio input captured by an audio input/processor, one example of which is a microphone of the one or more sensors 108. In one embodiment, the audio input/processor can include a voice recognition engine. Regardless of the specific implementation utilized in the various embodiments, the audio input/processor can access various speech models to identify speech commands in one or more embodiments.

An environmental and/or context sensing engine 110 can be operable with the one or more sensors 108 to detect a condition of the electronic device 100. The environmental and/or context sensing engine 110 can be used to detect, infer, capture, and otherwise determine conditions about the electronic device 100. In one embodiment, environmental and/or context sensing engine 110 determines, from the one or more sensors 108, assessed contexts and frameworks using adjustable algorithms of context assessment employing information, data, and events. These assessments may be learned through repetitive data analysis. Alternatively, a user may employ the user interface 102 to enter various parameters, constructs, rules, and/or paradigms that instruct or otherwise guide the environmental and/or context sensing engine 110 in detecting conditions of the electronic device 100 and other contextual information. The environmental and/or context sensing engine 110 can comprise an artificial neural network or other similar technology in one or more embodiments.

In one or more embodiments, the environmental and/or context sensing engine 110 is operable with the one or more processors 104. In some embodiments, the one or more processors 104 can control the environmental and/or context sensing engine 110. In other embodiments, the environmental and/or context sensing engine 110 can operate independently, delivering information gleaned from detecting conditions of the electronic device 100 and other contextual information to the one or more processors 104. The environmental and/or context sensing engine 110 can receive data from one or more sensors 108. In one or more embodiments, the one or more processors 104 are configured to perform the operations of the environmental and/or context sensing engine 110.

In one or more embodiments, the electronic device 100 comprises a device housing 113. In one or more embodiments, an illuminative fabric display 1200 is coupled to the device housing 113.

Turning briefly to FIG. 2, and illustrating by example, in one embodiment the illuminative fabric display 1200 is mechanically attached to the device housing 113. For instance, where the device housing 113 is manufactured from metal, the illuminative fabric display 1200 can be adhesively attached to the device housing 113.

In other embodiments, the illuminative fabric display 1200 is integrated into the device housing 113. For instance, when the device housing 113 is manufactured from a thermoplastic material, the illuminative fabric display 1200 can be integrated into the device housing 113 while the thermoplastic material is in a softened state. Other techniques for attaching or integrating the illuminative fabric display 1200 into the device housing 113 will be obvious to those of ordinary skill in the art having the benefit of this disclosure.

In one or more embodiments, the illuminative fabric display comprises warps (1201,1202,1203,1204) and wefts (1205,1206,1207,1208) of textile material, such as cotton, arranged in a weave with electroluminescent elements 1212 interspaced within the (1201,1202,1203,1204) and wefts (1205,1206,1207,1208) of textile material. In one or more embodiments, the electroluminescent elements 1212 are defined by intersections of luminescent warps 1209 and transparent conductive wefts 1211 within the weave of the illuminative fabric display 1200.

Turning now back to FIG. 1, in one or more embodiments the electronic device 100 includes an illuminative fabric display coupler 115. Recall from above that in one or more embodiments the illuminative fabric display 1200 comprises integrated touch-sensitive fabric keyboards and/or a fabric power supply, which optionally harvests solar energy. In one or more embodiments, the illuminative fabric display coupler 115 comprises a communication device that facilitates electrical communication between the illuminative fabric display 1200 and the one or more processors 104, thereby allowing the one or more processors 104 to present content generated by a content creation engine 111 on the illuminative fabric display 1200.

In one or more embodiments, display 101 serves as the primary display for the electronic device 100. Moreover, as shown in FIG. 1, in this illustrative embodiment display 101 defines a major surface (the front major surface facing outward from the page), while the device housing 113 defines a second major surface of the electronic device 100. In one or more embodiments, when the one or more processors 104, in response to determining from the one or more sensors 108 that display 101 defines a bottom side of the electronic device 100 in three-dimensional space, such as when the electronic device 100 is resting on a table with the display 101 abutting the table, to cause the illuminative fabric display 1200 to present content generated by the content creation engine 111. In one or more embodiments, this presentation occurs in response to user input received by the illuminative fabric display. In one or more embodiments, the content presented and the user input causing the presentation of the content are user definable. Examples of types of content and types of user input will be described in more detail below with reference to FIGS. 7-10. Others will be obvious to those of ordinary skill in the art having the benefit of this disclosure.

In one or more embodiments the one or more sensors 108 of the electronic device 100 detect a condition of the electronic device 100. Examples of such a condition include an identified surface type, an identified surface shape, an identified surface configuration, velocity or movement of the electronic device, active usage of the electronic device, stowing actions or states, user interactions or configurations, and even surface conditions. In one or more embodiments, when the display 101 is inaccessible to a user, the one or more processors 104 cause the illuminative fabric display 1200 to present information to a user.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Figure 3:
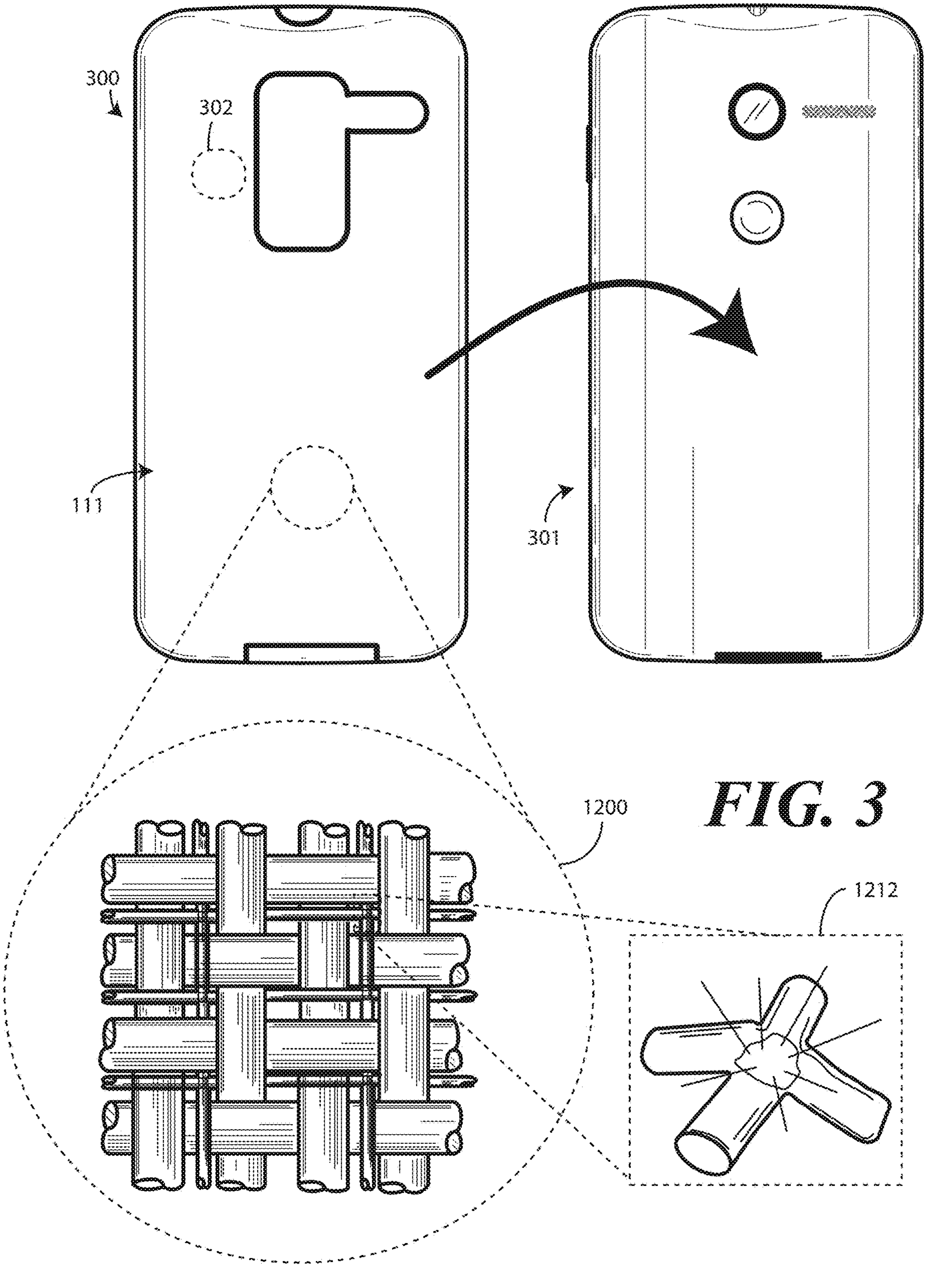
FIG. 3 illustrates still another explanatory electronic device configured in accordance with one or more embodiments of the disclosure.
Figure 4:
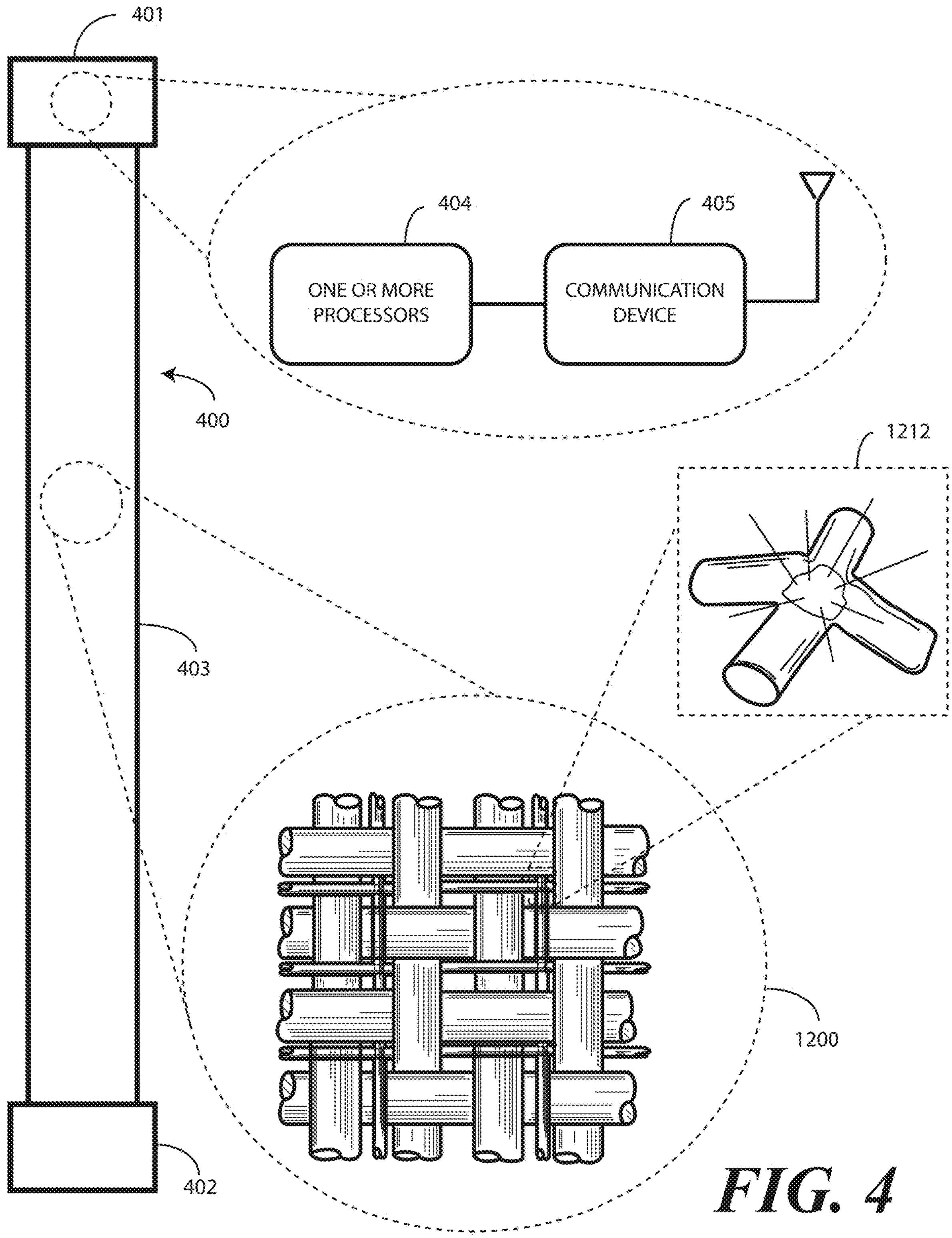
FIG. 4 illustrates yet another explanatory electronic device in accordance with one or more embodiments of the disclosure.

As shown in FIG. 1, the illuminative fabric display 1200 can be attached to, or integrated into, the device housing 113 of an electronic device 100. Alternatively, the illuminative fabric display 1200 can be incorporated into a companion device, examples of which include a case or wrist-worn strap. Turning now to FIGS. 3-4, illustrated therein are examples of such companion devices.

Beginning with FIG. 3, in this illustrative embodiment the companion device comprises a case 300, which can be coupled to an electronic device 301. In one or more embodiments, the illuminative fabric display 1200 and its electroluminescent elements 1212 are coupled to the case 300. In other embodiments, the fabric display 1200 and its electroluminescent elements 1212 are integrated into the case 300.

In one or more embodiments the case 300 comprises a communication device 302 that is coupled, by a wire or wirelessly, to the illuminative fabric display coupler (115) of the electronic device 301 so that one or more processors of the electronic device 301 can cause the illuminative fabric display 1200 to present content generated by a content creation engine (111) on the illuminative fabric display 1200. The communication device 302 can also be operable with one or more sensors carried by the case 300 in one or more embodiments. Alternatively, in other embodiments the case 300 may include electrical connections coupling the communication device 302 to the one or more processors carried by the electronic device 301.

By contrast, turning now to FIG. 4, in this illustrative embodiment the companion device comprises a wrist-worn strap 400. In this illustrative embodiment, the illuminative fabric display 1200 defines a strap 403 situated between two coupling elements 401,402 so that the wrist-worn strap 400 can be worn like a bracelet. In other embodiments, a mechanical support layer is situated under the strap 403 for mechanical reinforcement.

In one or more embodiments, the illuminative fabric display 1200 defining the strap 403 is electronically coupled to another communication device 405, and optionally one or more processors 404 that are operable with the communication device 405. In one or more embodiments, the other communication device 405 can be electronically in communication with a communication device (106) of an electronic device (100). In one or more embodiments, the one or more processors (104) of the electronic device (100) are operable to cause the illuminative fabric display 1200 of the strap 403 to present content along the illuminative fabric display 1200 by causing the communication device (106) of the electronic device (100) to transmit electronic signals to the communication device 405 of the wrist-worn device 400.

Figure 5:
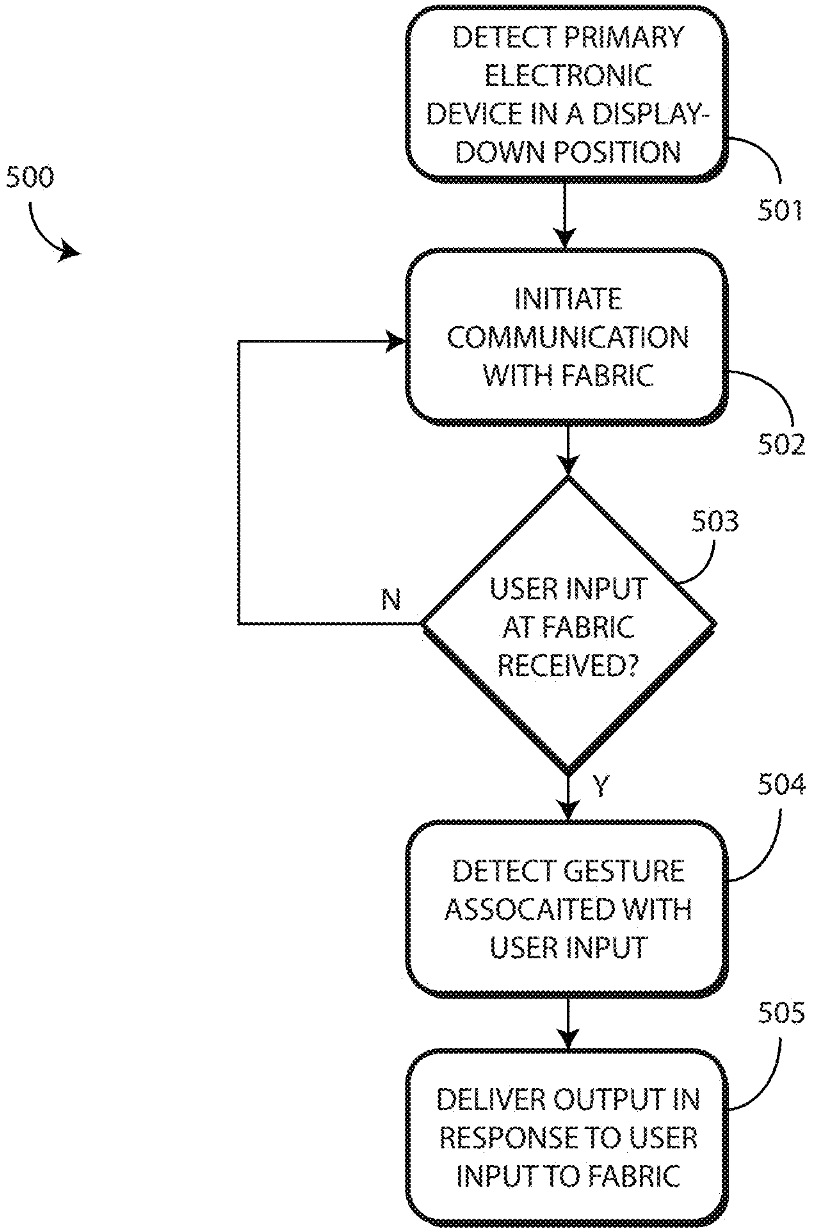
FIG. 5 illustrates one explanatory method in accordance with one or more embodiments of the disclosure.

Turning now to FIG. 5, illustrated therein is one explanatory method 500 for presenting content on an illuminative fabric display (1200), be it attached to or integrated with a device housing (113), a case (300), a wrist-worn device (400), or another companion device. In one or more embodiments, the method 500 is configured to cause the illuminative fabric display (1200) to present content only when a primary display of an electronic device, e.g., the display (101) of the electronic device (100) of FIG. 1, is inaccessible to a user. Illustrating by example, in one or more embodiments the method 500 of FIG. 5 allows one or more processors (104) of the electronic device (100), in response to determining from one or more sensors (108) that a primary display defines a bottom side of the electronic device (100) in three-dimensional space, to cause the illuminative fabric display (1200) to present content, examples of which include indicia identifying incoming communications from a remote electronic device across a network.

Beginning at step 501, the method 500 uses one or more sensors (108) of an electronic device (100) to determine that the primary display of the electronic device (100) is inaccessible to a user. In one or more embodiments, step 501 comprises determining that the primary display of the electronic device (100) is in a display-down position, which can occur when the electronic device (100) is resting on a table with the display (101) abutting the surface of the table. This can be done, for example, when an accelerometer detects a direction of gravity passing from the rear major surface through the front major surface, with the touch sensors of the display (101) determining that a surface of the display (101) is abutting the surface. Other techniques for determining this "display down" configuration will be obvious to those of ordinary skill in the art having the benefit of this disclosure.

At step 502, electronic communication is established between one or more processors (104) of the electronic device (100) and the illuminative fabric display (1200). In one or more embodiments, this communication is established directly using an illuminative fabric display coupler (115). This may be the case, for example, when the illuminative fabric display (1200) is integrated into a device housing (113) of the electronic device (100) or directly coupled from a case (300) through an electrical connector to the electronic device (100). In other embodiments, this communication will be wirelessly, such as may be the case when a case (300) is not directly connected to the electronic device (100) or when the illuminative fabric display (1200) is integrated into a wrist-worn device (400).

Optional decision 503 determines whether the illuminative fabric display (1200) receives user input. Where it does, the method 500 moves to step 504. Otherwise, the method 500 returns to step 502.

At step 504, one or more processors (104) of an electronic device (100) determine with what predefined gesture the user input received is associated. As will be illustrated in more detail below with reference to FIGS. 7-10, in one or more embodiments content presented on an illuminative fabric display (1200) is responsive to predefined gestures.

At step 505, the one or more processors (104) of the electronic device (100) present content on the illuminative fabric display (1200). In one or more embodiments, the content presented at step 505 occurs in response to user input received by the illuminative fabric display (1200), as detected by optional decision 503. In one or more embodiments, the content comprises one or more of a time of day, a message, or a notification.

Figure 6:
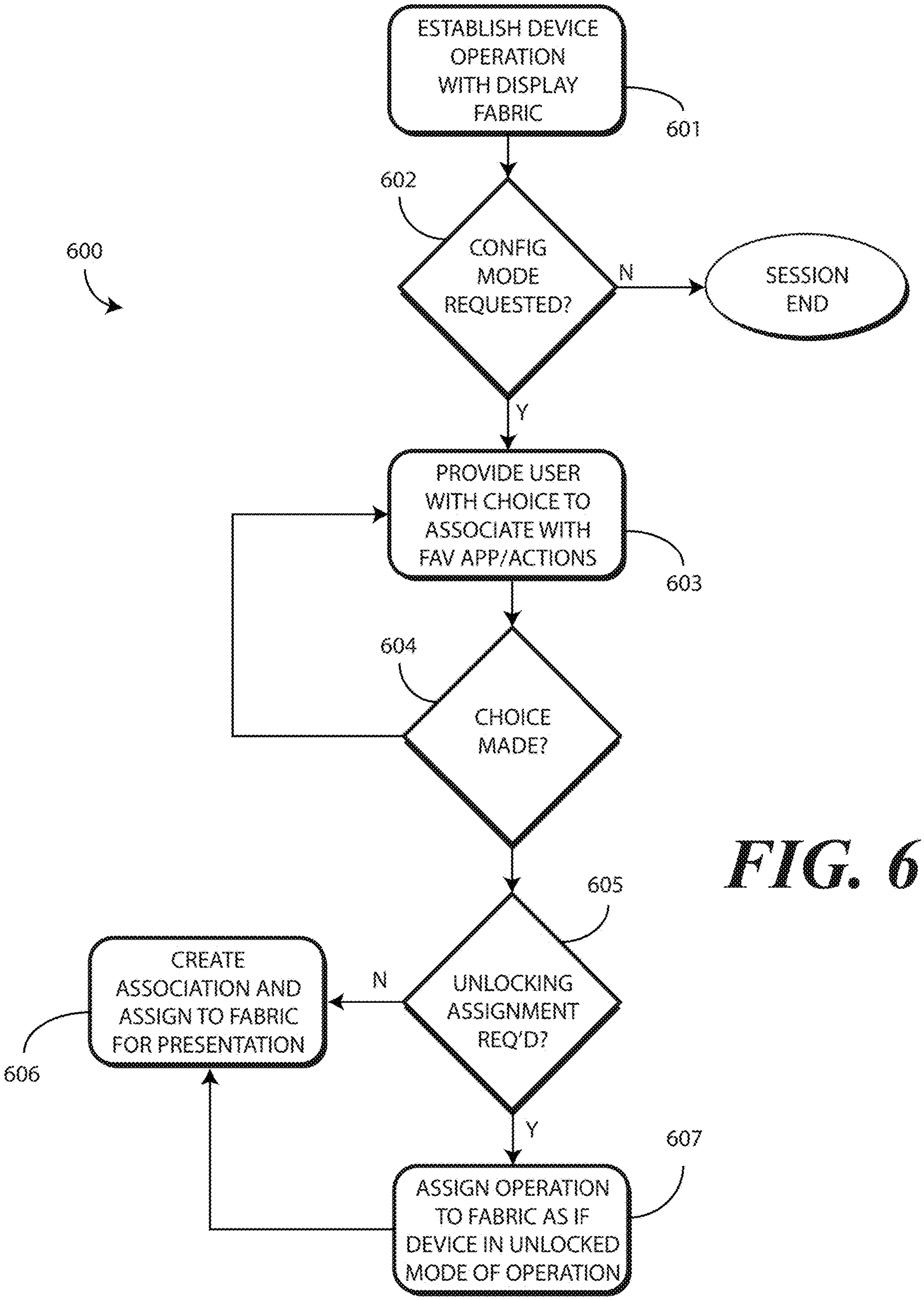
FIG. 6 illustrates another explanatory method in accordance with one or more embodiments of the disclosure.

Since the content presented can be associated with predefined gestures defined by user input received by the illuminative fabric display (1200), embodiments of the disclosure contemplate that at some stage the one or more processors (104) will have to be trained so that the predefined gestures can indeed become predefined. Turning now to FIG. 6, illustrated therein is one explanatory method 600 for doing so.

Beginning at step 601, communication is established between one or more processors (104) of an electronic device (100) and an illuminative fabric display (1200), be it attached to or integrated with a device housing (113), a case (300), a wrist-worn device (400), or another companion device. Some techniques for doing this step 601 were described above with reference to step (502) of FIG. 5. Others will be obvious to those of ordinary skill in the art having the benefit of this disclosure.

Decision 602 determines whether a predefined gesture configuration mode is invoked. Where it is, the method 600 moves to step 603. Otherwise, the configuration session can end.

Step 603 presents, optionally on a display (101) of the electronic device (100), options to associate predefined gestures with predefined applications or predefined application or device operations. Where a choice is made, as determined by decision 604, decision 605 determines whether an unlocking operation is required. Embodiments of the disclosure contemplate that some information, such as the time of day or the weather, can be accessible even when an electronic device (100) is locked. Other information, by contrast, examples of which include financial data, electronic communications, health data, and so forth, require the electronic device (100) to be unlocked with biometric or other authentication processes before it can be accessed. Decision 605 determines which is required.

If an unlocking operation is required, step 607 assigns the operation associated with the feature or function associated with the predefined gesture to the illuminative fabric display (1200) as if the electronic device (100) is in an unlocked mode of operation. However, where no unlocking operation is required, step 606 assigns the feature or function associated with the predefined gesture to the illuminative fabric display (1200). Once the predefined gestures have been associated with the features or functions of the applications and/or device functions in accordance with the method 600 of FIG. 6, the method (500) of FIG. 5 can be used to cause the illuminative fabric display (1200) to present content accordingly.

Thus, the method 600 of FIG. 6 provides techniques for receiving, by a user interface (102) of an electronic device (100), user input associating the user input with the content and associating, by the one or more processors (104), the content with the user input prior to presenting the content in response to the user input. To illustrate how the methods (500),600 of FIGS. 5-6 can facilitate the presentation of content in response to predefined gestures, turn now to FIGS. 7-8 where two explanatory examples are illustrated. Others will be illustrated and described with reference to FIGS. 9-10 below. Still others will be obvious to those of ordinary skill in the art having the benefit of this disclosure.

Figure 7:
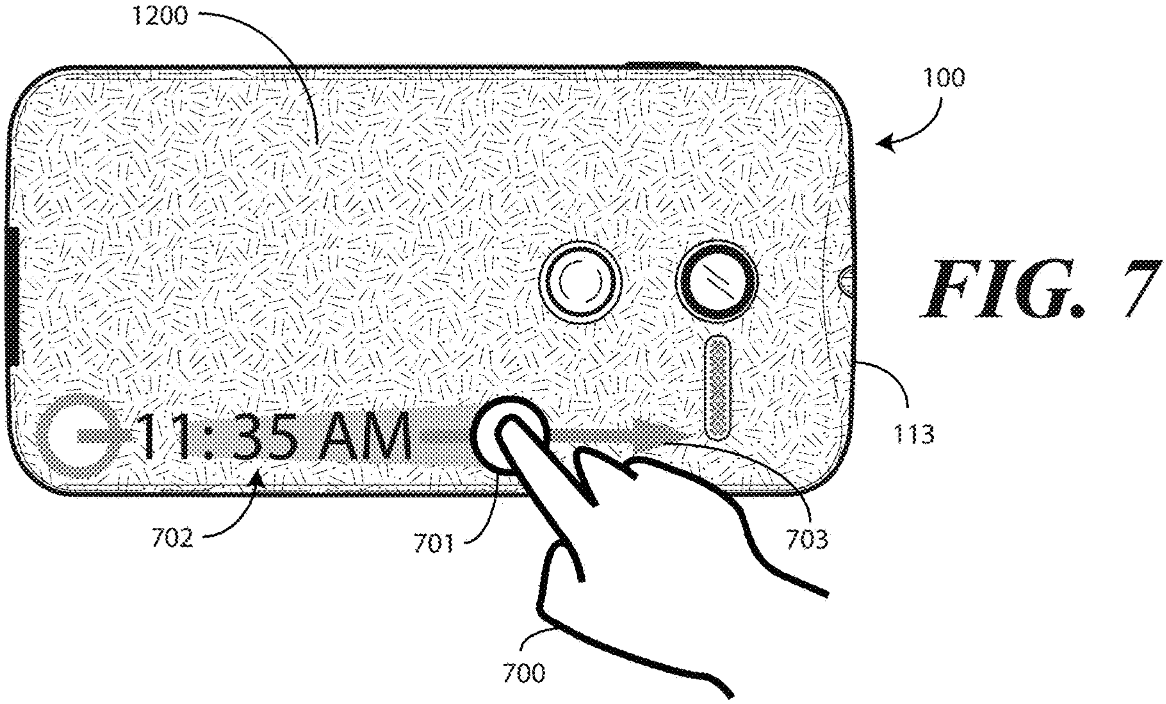
FIG. 7 illustrates one explanatory electronic device in use in accordance with one or more embodiments of the disclosure.

Beginning with FIG. 7, an electronic device 100 comprises a device housing 113. An illuminative fabric display 1200 is coupled to the device housing 113. In this illustrative embodiment, the illuminative fabric display 1200 is integrated into the device housing 113. In the illustrative embodiment of FIG. 7, the electronic device 100 has a display (101) that defines a bottom side of the electronic device in three-dimensional space, as the electronic device 100 is shown in a top plan view resting on a surface represented by the page with the display (101) abutting the surface. Thus, one or more sensors (108) of the electronic device can determine that the display (101) defines a bottom side of the electronic device 100 in three-dimensional space.

As shown in FIG. 7, the illuminative fabric display 1200 is receiving user input 701 from a user 700. In response, the one or more processors (104) cause the illuminative fabric display 1200 to present content 702. While the content 702 can take various forms, examples of which include indicia of received messages and/or received notifications, in this illustrative embodiment the content 702 comprises the time of day.

In this illustrative embodiment, the user input 701 comprises a slide gesture 703. Thus, in this example when the user input 701 comprises a slide gesture 703 along a surface of the illuminative fabric display 1200, the one or more processors (104) cause the illuminative fabric display 1200 to present the time of day. As noted above, in one or more embodiments the user 700 can define the slide gesture 703 to be associated with the presentation of the time of day.

Figure 8:
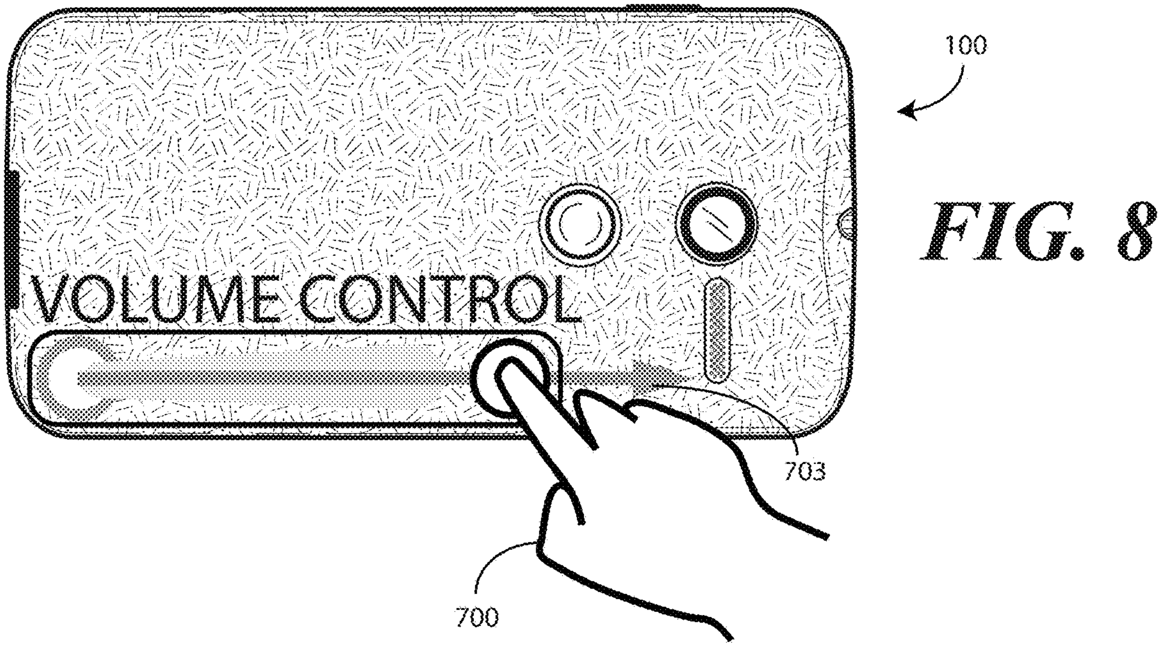
FIG. 8 illustrates another explanatory electronic device in use in accordance with one or more embodiments of the disclosure.

By contrast, in FIG. 8 the user 700 has associated with the slide gesture 703 has been associated with an application function using the method (600) of FIG. 6 described above. In this example, the slide gesture 703 has been associated with one or more controls of an application operating on the one or more processors (104) of the electronic device 100. In this example, the application comprises a music player and the control is a volume control for the music player. Thus, in this example, in response to an application (here, a music player) operating on the one or more processors (104) of the electronic device when the display (101) defines the bottom side of the electronic device 100 in three-dimensional space, the content comprises one or more controls for the application operating on the one or more processors (104). Here, the application comprises a music player application and the one or more controls comprise a volume control.

Turning now to FIG. 9, illustrated therein are one or more method steps for using an electronic device 100 having an illuminative fabric display 1200 configured in accordance with one or more embodiments of the disclosure. In this example, the user 700 has associated two predefined gestures with a control operation associated with an application operating on the one or more processors (104) of the electronic device 100. In this example, the control operation is making a phone call and the application operating on the one or more processors (104) of the electronic device 100 is a voice call application.

Beginning at step 901, the user 700 makes a first predefined gesture, which in this example is a slide gesture 703 along the surface of the illuminative fabric display 1200. As shown at step 901, this reveals content indicating who should be called. In one or more embodiments, the user 700 can make scrolling gestures to change who should be called. Since Buster is indeed the one that the user 700 wants to call, the method moves to step 902.

At step 902, the user 700 makes a second predefined gesture to cause the electronic device 100 to initiate ta call to Buster. In this example, the predefined gesture comprises a double tap gesture 903. In response to the double tap gesture 903, the one or more processors (104) of the electronic device 100 cause the telephone call to Buster to be initiated.

Thus, as shown in FIG. 9, the one or more processors (104) of the electronic device 100 are configured to execute a control operation (making the call to Buster) in response to user input received by the illuminative fabric display 1200 after the control operation (whom to call) is presented on the illuminative fabric display. While a telephone call is one such control operation, others will be obvious to those of ordinary skill in the art having the benefit of this disclosure.

Figure 10:
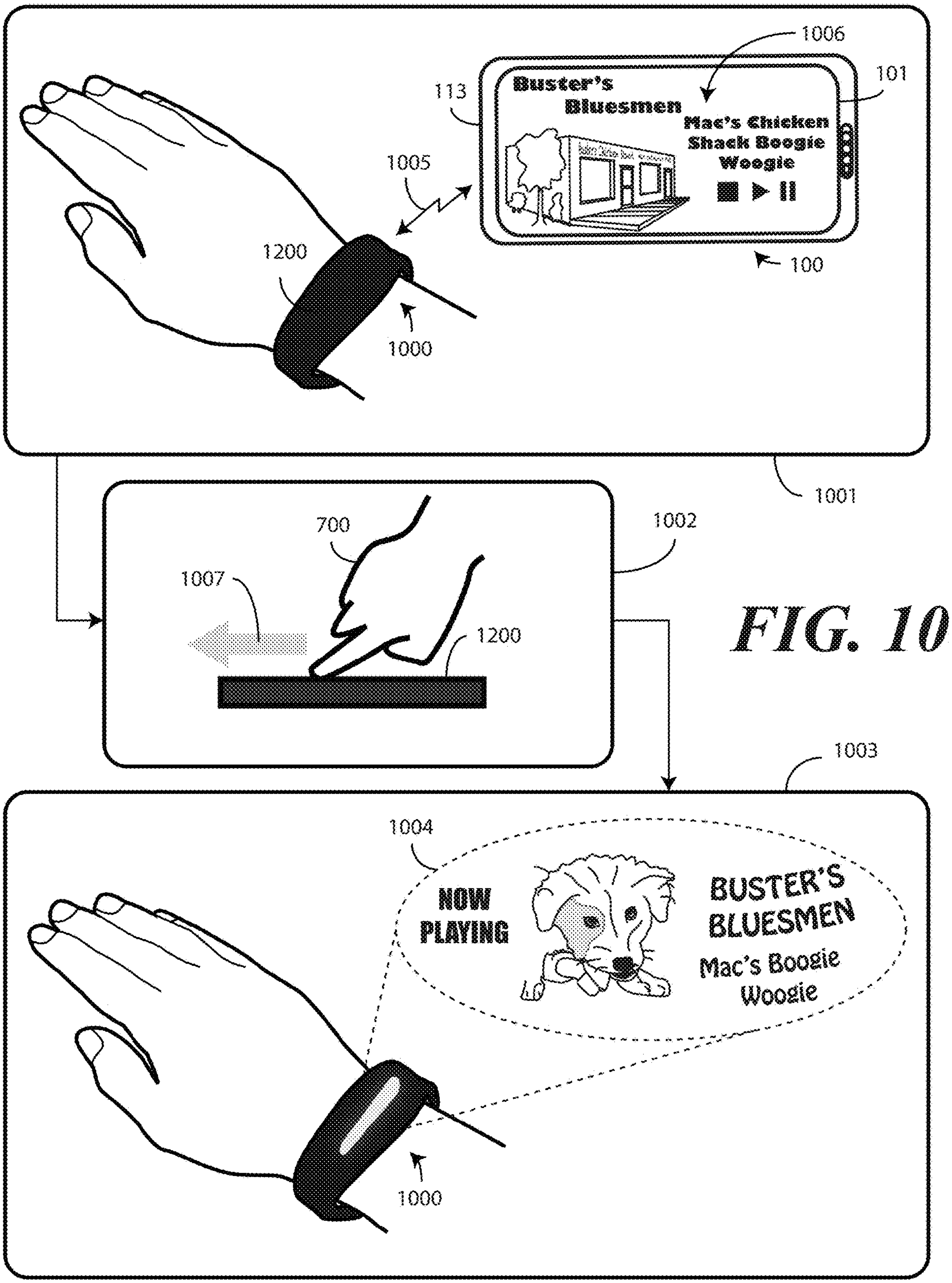
FIG. 10 illustrates one or more method steps in accordance with one or more embodiments of the disclosure.

Turning now to FIG. 10, illustrated therein are one or more method steps showing how content 1004 can be presented on a companion device 1000 configured as a wrist-worn strap and comprising an illuminative fabric display 1200. Beginning at step 1001, a system is shown.

The system of step 1001 comprises an electronic device 100 having a device housing 113, a communication device (106) situated within the device housing 113, and one or more processors (104). The one or more processors (104) are situated within the device housing 113 and are operable with the communication device (106).

The system of step 1001 also comprises a companion device 1000, which is separate from the electronic device 100. The companion device 1000 comprises an illuminative fabric display 1200 coupled to another communication device (405) that is in communication with the communication device (106) of the electronic device 100. In one or more embodiments, the one or more processors (104) of the electronic device 100 are operable to cause the companion device 1000 to present content 1004 along the illuminative fabric display 1200 by causing the communication device (106) to transmit electronic signals 1005 to the other communication device (405) of the companion device 1000.

In this illustrative embodiment, the content 1004 is presented on the illuminative fabric display 1200 in response to user input while an application, shown here is a music player application 1006, is operating the one or more processors (104) of the electronic device 100. At step 1002, the user 700 wearing the companion device 1000 as a wrist-wearable strap delivers the user input 1007 to the surface of the illuminative fabric display 1200. In this illustrative embodiment, the user input 1007 is a slide gesture.

At step 1003, the one or more processors (104) of the electronic device 100 cause the companion device 1000 to present the content 1004. The content 1004 in this illustrative example comprises indicia identifying which song had been playing. Had the application 1006 been a telephone application instead of a music player application, the content 1004 may have been indicia identifying incoming communications in response to the communication device (106) of the electronic device 100 receiving the incoming communications from a remote electronic device across a network.

In the illustrative embodiment of FIG. 10, the one or more processors (104) cause the companion device 1000 to present the content 1004 regardless of the orientation of the electronic device 100. However, as noted above, in other embodiments the one or more processors (104) are configured to cause the companion device 1000 to present the content 1004 along the illuminative fabric display 1200 by causing the communication device (106) to transmit the electronic signals 1005 to the other communication device (405) only when the display 101 of the electronic device 100 defines the bottom surface of the device housing 113 in three-dimensional space. Other conditions upon which the presentation of the content 1004 can be precedent will be obvious to those of ordinary skill in the art having the benefit of this disclosure.

Figure 11:
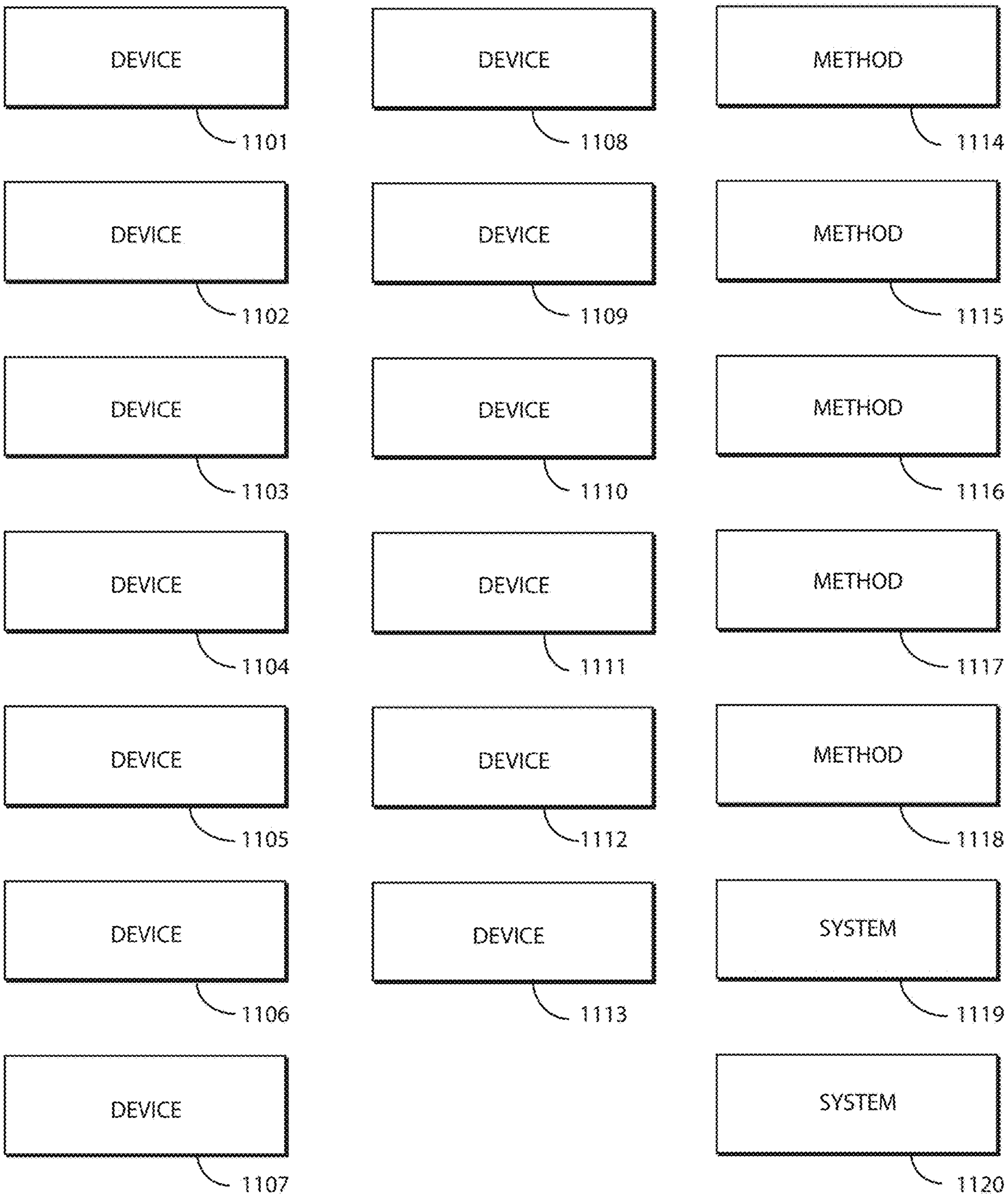
FIG. 11 illustrates one or more embodiments of the disclosure.

Turning now to FIG. 11, illustrated therein are various embodiments of the disclosure. The embodiments of FIG. 11 are shown as labeled boxes in FIG. 11 due to the fact that the individual components of these embodiments have been illustrated in detail in FIGS. 1-10, which precede FIG. 11. Accordingly, since these items have previously been illustrated and described, their repeated illustration is no longer essential for a proper understanding of these embodiments. Thus, the embodiments are shown as labeled boxes.

At 1101, an electronic device comprises a device housing. At 1101, the electronic device comprises an illuminative fabric display coupled to the device housing.

At 1102, the illuminative fabric display of 1101 comprises warps and wefts of textile material arranged in a weave with electroluminescent elements interspaced within the warps and the wefts of the textile material. At 1103, the electroluminescent elements of 1102 are defined by intersections of luminescent warps and transparent conductive wefts within the weave. At 1104, the illuminative fabric display of 1102 is integrated into the device housing.

At 1105, the electronic device of 1102 further comprises a case coupled to the electronic device. At 1105, the illuminative fabric display is integrated into the case.

At 1106, the electronic device of 1101 further comprises a primary display defining a major surface of the device housing. At 1106, the electronic device comprises one or more sensors. At 1106, the electronic device comprises one or more processors operable with the primary display and the one or more sensors.

At 1106, the one or more processors, in response to determining from the one or more sensors that the primary display defines a bottom side of the electronic device in three-dimensional space, cause the illuminative fabric display to present content. At 1106, the one or more processors cause the presentation of content in response to user input received by the illuminative fabric display.

At 1107, the user input of 1106 comprises a slide gesture along a surface of the illuminative fabric display. At 1107, the content comprises one or more of a time of day, received messages, and/or received notifications.

At 1108, in response to an application operating on the one or more processors while the primary display defines the bottom side of the electronic device in the three-dimensional space, the content of 1106 comprises one or more controls for the application operating on the one or more processors. At 1109, the application of 1108 comprises a music player application and the one or more controls comprise a volume control.

At 1110, the content of 1106 comprises a control operation to be performed by an application operating on the one or more processors. At 1110. the one or more processors are configured to execute the control operation in response to other user input received by the illuminative fabric display after the control operation is presented on the illuminative fabric display.

At 1111, the control operation of 1110 comprises causing the one or more processors to make a telephone call. At 1111, the user input comprises a slide gesture along a surface of the illuminative fabric display. At 1111, the other user input comprises a double-tap occurring on the surface of the illuminative fabric display. At 1112, the content of 1106 and the user input causing presentation of the content are both user definable.

At 1113, the electronic device of 1101 further comprises a primary display defining a major surface of the device housing, one or more sensors, a communication device, and one or more processors operable with the primary display, the one or more sensors, and the communication device. At 1113, the one or more processors, in response to determining from the one or more sensors that the primary display defines a bottom side of the electronic device in three-dimensional space, cause the illuminative fabric display to present indicia identifying incoming communications in response to the communication device receiving the incoming communications from a remote electronic device across a network.

At 1114, a method in an electronic device comprises presenting, by one or more processors of the electronic device, content on an illuminative fabric display coupled to a device housing of the electronic device. At 1115, the presenting the content of 1114 occurs in response to user input received by the illuminative fabric display. At 1116, the content of 1115 comprises one or more of a time of day, a message, or a notification.

At 1117, the method of 1115 further comprises receiving, by a user interface of the electronic device, prior user input associating the user input with the content. At 1117, the method comprises associating, by the one or more processors, the content with the user input prior to presenting the content in response to the user input. At 1118, the method of 1114 further comprises operating, by the one or more processors, an application, wherein the content comprises an output from the application.

At 1119, a system comprises an electronic device and a companion device. At 1119, the electronic device comprises a device housing, a communication device situated within the device housing, and one or more processors situated within the device housing and operable with the communication device. At 1119, the companion device is separate from the electronic device and comprises an illuminative fabric display coupled to another communication device electronically in communication with the communication device of the electronic device. At 1119, the one or more processors are operable to cause the companion device to present content along the illuminative fabric display by causing the communication device to transmit electronic signals to another communication device.

At 1120, the system further comprises a primary display defining a major face of the device housing. At 1120, the communication device is configured as a wrist-wearable strap and the one or more processors are configured to cause the companion device to present the content along the illuminative fabric display by causing the communication device to transmit the electronic signals to another communication device only when the primary display defines a bottom surface of the device housing in three-dimensional space.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, sliding gestures and double tap gestures were described above as explanatory predefined gestures with which functions of applications or device features can be associated. Others will be obvious to those of ordinary skill in the art having the benefit of this disclosure, such as long presses to launch a volume slider to adjust the volume of an earbud without physically accessing a volume key, single taps to initiate calls after a double tap identifying two whom the call will be placed, and single taps to present information such as the time of day and minimal information such as notifications and messages.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:

a device housing; and an illuminative fabric display coupled to the device housing;

a primary display defining a first major surface of the device housing;

one or more sensors; and one or more processors operable with the primary display and the one or more sensors;

wherein the one or more processors, in response to determining from the one or more sensors that the primary display is covered and the illuminative fabric display is exposed, cause the illuminative fabric display to present content in response to user input received by the illuminative fabric display.

2. The electronic device of claim 1, wherein the illuminative fabric display comprises warps and wefts of textile material arranged in a weave with electroluminescent elements interspaced within the warps and the wefts of the textile material.

3. The electronic device of claim 2, wherein the electroluminescent elements are defined by intersections of luminescent warps and transparent conductive wefts within the weave.

4. The electronic device of claim 2, wherein the illuminative fabric display is integrated into the device housing.

5. The electronic device of claim 2, further comprising a case coupled to the electronic device, wherein the illuminative fabric display is integrated into the case.

6. The electronic device of claim 1, wherein the illuminative fabric display is coupled to a second:

major surface of the device housing;

wherein the second major surface is opposite the first major surface.

7. The electronic device of claim 6, wherein the user input comprises a slide gesture along a surface of the illuminative fabric display and the content comprises one or more of a time of day, received messages, and/or received notifications.

8. The electronic device of claim 6, wherein, in response to an application operating on the one or more processors while the primary display defines a bottom side of the electronic device in three-dimensional space, the content comprises one or more controls for the application operating on the one or more processors.

9. The electronic device of claim 8, wherein the application comprises a music player application and the one or more controls comprise a volume control.

10. The electronic device of claim 6, wherein:

the content comprises a control operation to be performed by an application operating on the one or more processors; and the one or more processors are configured to execute the control operation in response to other user input received by the illuminative fabric display after the control operation is presented on the illuminative fabric display.

11. The electronic device of claim 10, wherein:

the control operation comprises causing the one or more processors to make a telephone call;

the user input comprises a slide gesture along a surface of the illuminative fabric display; and the other user input comprises a double-tap occurring on the surface of the illuminative fabric display.

12. The electronic device of claim 6, wherein the content and the user input causing presentation of the content are both user definable.

13. The electronic device of claim 1, wherein the one or more processors are configured to accept touch input received by the illuminative fabric display to modify content presented on the illuminative fabric display only when the one or more sensors determine that the primary display is inaccessible.

14. A method for an electronic device, the method comprising presenting, by one or more processors of the electronic device, content on an illuminative fabric display coupled to a device housing of the electronic device only when a primary display is covered or inaccessible.

15. The method of claim 14, wherein the presenting the content occurs in response to user input received by the illuminative fabric display.

16. The method of claim 15, wherein the content comprises one or more of a time of day, a message, or a notification.

17. The method of claim 15, further comprising:

receiving, by a user interface of the electronic device, prior user input associating the user input with the content; and associating, by the one or more processors, the content with the user input prior to presenting the content in response to the user input.

18. The method of claim 14, further comprising operating, by the one or more processors, an application, wherein the content comprises an output from the application.

19. A system, comprising:

an electronic device, comprising:

a device housing;

a primary display;

a communication device situated within the device housing;

one or more processors situated within the device housing and operable with the communication device and the primary display; and a companion device, separate from the electronic device, and comprising an illuminative fabric display coupled to another communication device electronically in communication with the communication device of the electronic device;

wherein the one or more processors are operable to cause the companion device to present content along the illuminative fabric display by causing the communication device to transmit electronic signals to the another communication device when the primary display is face down.

20. The system of claim 19, wherein:

the one or more processors are configured to determine the primary display is face down when the primary display defines a bottom surface of the device housing in three-dimensional space.

21. An electronic device, comprising:

a device housing; and an illuminative fabric display coupled to the device housing;

wherein the illuminative fabric display comprises warps and wefts of textile material arranged in a weave with electroluminescent elements interspaced within the warps and the wefts of the textile material; and wherein the electroluminescent elements are defined by intersections of luminescent warps and transparent conductive wefts within the weave.

* * * * *